United States Patent [19]

Ay et al.

[11] 4,192,173
[45] Mar. 11, 1980

[54] ECCENTRIC PIN MOUNTING SYSTEM

[75] Inventors: Leo E. Ay, San Juan Capistrano; Ramon E. Arriaza, Fountain Valley, both of Calif.

[73] Assignee: Pacific Scientific Company, Anaheim, Calif.

[21] Appl. No.: 928,194

[22] Filed: Jul. 26, 1978

[51] Int. Cl.² ............................................. G01M 19/00
[52] U.S. Cl. ....................................... 73/11; 74/571 L
[58] Field of Search ................... 73/11, 667; 188/1 B; 74/117, 571 L

[56] References Cited
U.S. PATENT DOCUMENTS

| | | | |
|---|---|---|---|
| Re 29221 | 5/1977 | Young | 188/1 B |
| 636,679 | 11/1899 | Michelsen | 74/571 L |
| 2,932,255 | 4/1960 | Newkirch | 74/117 X |
| 3,811,316 | 5/1974 | Amendolia | 73/11 |
| 4,031,778 | 6/1977 | Fazeleas | 74/571 L |

*Primary Examiner*—S. Clement Swisher
*Assistant Examiner*—Denis E. Corr
*Attorney, Agent, or Firm*—Knobbe, Martens, Olson, Hubbard & Bear

[57] ABSTRACT

A mounting pin of circular cross-section is rendered eccentric and used to artifically agitate a motion snubber used to shock mount components of a nuclear power plant, thereby making possible testing of such a snubber without dismounting it.

26 Claims, 8 Drawing Figures

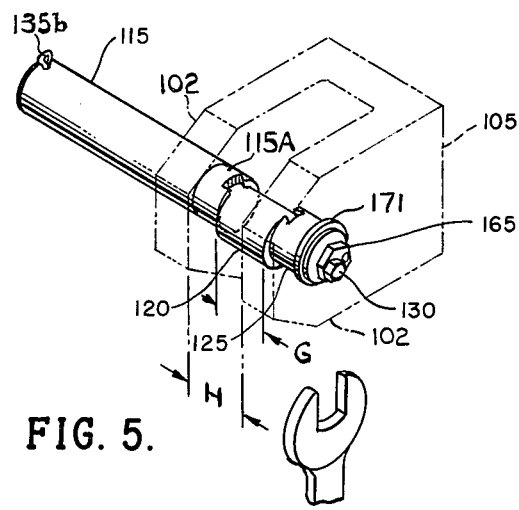
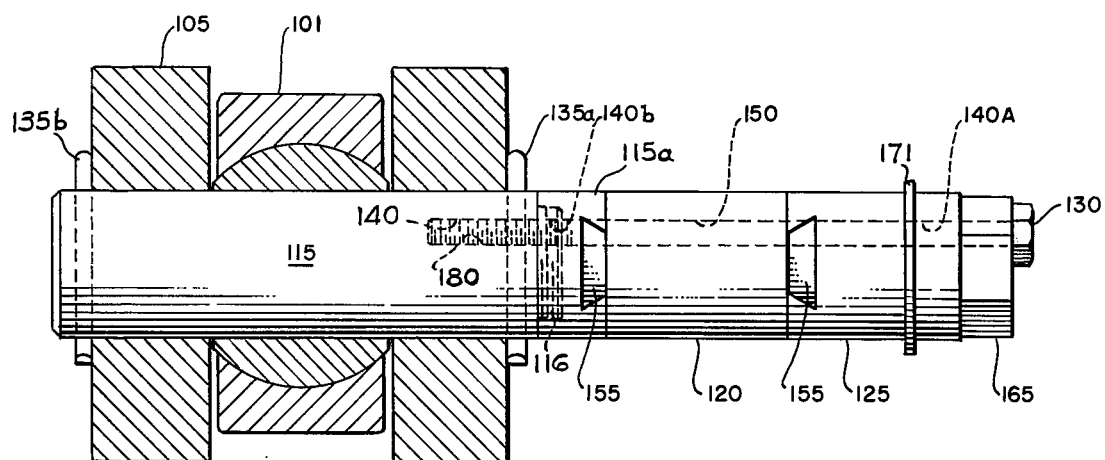
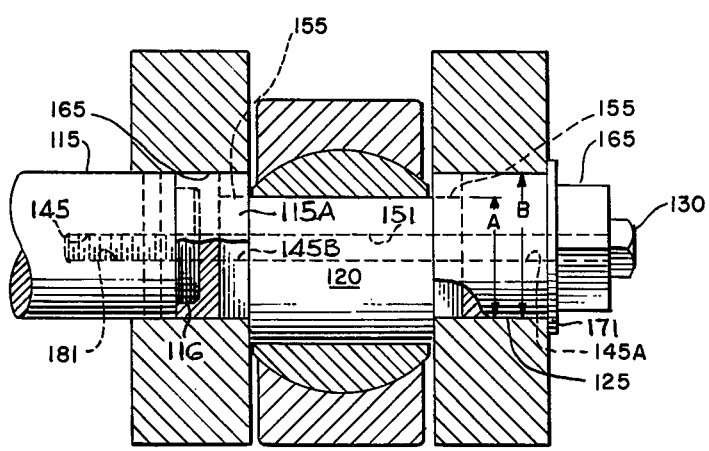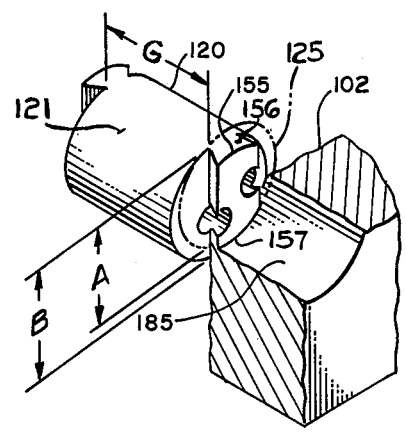

ECCENTRIC PIN MOUNTING SYSTEM

BACKGROUND OF THE INVENTION

In the development and design of nuclear power plants, a prime goal is radiation safety of personnel. Piping and other components of such power plants are typically shock mounted by mechanical snubbers or shock arrestors which permit movement due to thermal changes but limit rapid movement in order to alleviate the danger of components rupturing and possible leakage radiation. Such mechanical shock might be the result of an earthquake, for example. The snubbers used in such a system may never be subjected to earthquake-type shocks over a period of years. Thus, the concern is with the possibility that such a snubber would be unable to perform its function of shock arresting.

As a result of this concern, it is desirable that the snubbers be tested for their ability to dampen shock and to remain mobile. This has necessitated removing or at least partially removing the snubber from its mounting to a test station so that it can be collapsed or extended or otherwise moved according to the specifications of the test procedure required. Such a procedure requires that a technician enter the nuclear reactor area, necessarily exposing himself to radiation levels which can be endured a limited number of times only, and disassembling the snubber mounting system to permit it to be removed for testing. After testing, the snubber would then have to be once again mounted in the reactor. After a limited period of time, the technician will have sustained his maximum lifetime dosage of nuclear radiation, and at that point would then no longer be able to perform such work.

Further compounding the snubber removal operation is the fact that some snubbers are mounted at considerable height or in otherwise awkward locations, thus requiring considerable time for complete removal. Further, some snubbers are quite heavy and thus require more than one person for removal or installation. There is also the danger that an earthquake might occur while a snubber is being removed. Accordingly, a need exists for improving the procedure for testing such motion snubbers, and the present invention satisfies such need.

SUMMARY OF THE INVENTION

This invention permits the testing of a motion snubber, in place, without dismounting the snubber. This is accomplished by using an eccentric mounting pin supporting the snubber in which the pin may be rendered circular or eccentric without dismounting the snubber. Rotation of the eccentrically configured pin reciprocates the strut-like snubber to perform the testing.

In a preferred form of the invention the pin consists of a cylindrical middle member, transversely, slidably mounted between two cylindrical outer members, with a bolt holding all three members in either of two selected positions. The middle member is disposed within a hole in a tongue on the end of the snubber. The invention employs the force of gravity to move the pin between the circular configuration and the eccentric configuration. For example, if the pin is in the concentric configuration, the pin is rotated within the snubber and a supporting clevis until the middle cylindrical member of the pin can slide vertically with respect to the outer pin members upon removal of the bolt. If the bolt is removed, the weight of the snubber forces the middle member of the pin to slide until its axis is displaced from the axis of the two outer members of the pin.

In its eccentric configuration, rotation of the pin results in eccentric movement of the middle member on which the snubber is mounted, resulting in an axial displacement of the strut-like snubber requisite to fulfill any testing requirement for the mounting system. Since the snubber remains firmly mounted to the clevis by the pin at all times, the pipe or other component is always securely mounted even during the testing of the snubber.

DESCRIPTION OF FIGURES

FIG. 5 is a perspective view of the mounting pin disposed within the clevis with the snubber removed so that the eccentric position of the slidable portion of the mounting pin of this invention may be more clearly illustrated;

FIG. 6 is a cross-sectional view of the mounting system illustrated in FIG. 3 taken along lines 6—6 showing the mounting pin in its normal configuration within the clevis and snubber;

FIG. 7 is a cross-sectional view of the mounting system of FIG. 4 taken along lines 7—7 showing the pin in its eccentric position within the clevis and snubber; and FIG. 8 is a partially cutaway perspective view of the slidable portion of the mounting pin and clevis showing the function that the dovetail tongue performs to provide a stopping ledge against the surface of the clevis defining the extent of eccentricity of the mounting pin.

DESCRIPTION OF THE PREFERRED EMBODIMENT

Figure 1:
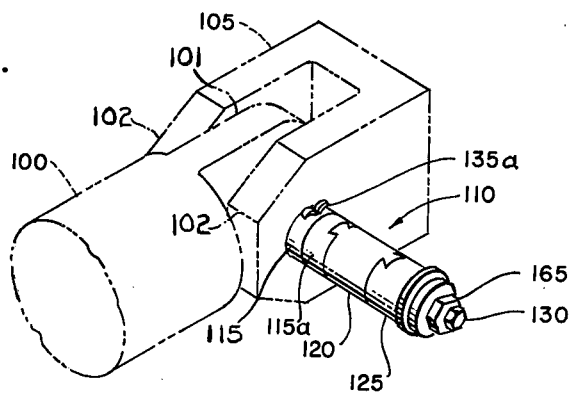
FIG. 1 is a perspective view showing the unique mounting pin of this invention disposed within a clevis in the normal configuration wherein the pin slidable portion does not support the snubber.
Figure 2:
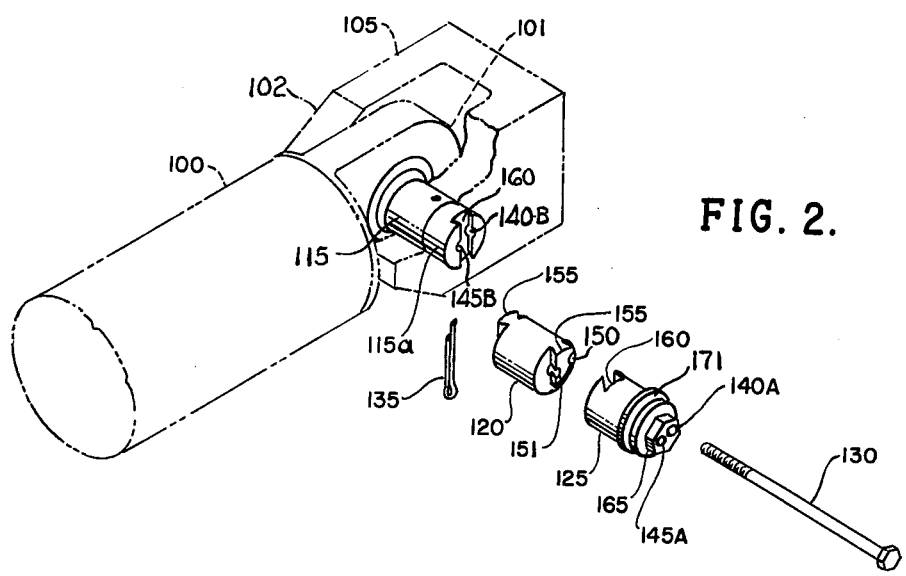
FIG. 2 is a perspective view of the mounting pin similar to FIG. 1 but with a portion of the mounting pin disassembled.

The unique mounting structure, illustrated in FIGS. 1 and 2, pivotally supports a motion snubber 100, a portion of which is shown in phantom lines. The snubber includes a large flat tongue 101, positioned between the legs 102 of a yoke or clevis 105 with a pin 110 extending through a hole in the tongue 101 axially aligned with holes in the legs 102.

The snubber 100 is a device intended to snub or restrict movement of a component subjected to rapid acceleration, while permitting unrestricted slow movement. A currently common usage of such a snubber is to restrict acceleration of a pipe or other such component in a power generating system, particularly a nuclear system, when subjected to seismic shock, while permitting unrestricted slow movement due to thermal expansion and contraction. In such an arrangement one end of a telescoping strut-like snubber is connected to an element, such as the clevis 105, which in turn is attached to or forms a part of a bracket connected to a pipe or some such component (not shown) while the other end of the strut is connected to a wall or other support structure. The pipe itself is supported by conventional pipe hangers while the snubber merely controls movement of the pipe.

For a further explanation of a preferred type of strut refer to U.S. Pat. No. Re.29,221. While that patent shows an all-mechanical strut-like snubber, snubbers may take other configurations and some are hydraulically operated.

The pin 110 is divided into four portions, a long end portion 115, a major portion of which is shown in FIG. 1 disposed within the tongue 101 of the snubber 100 and the clevis 105, an intermediate portion 115A, a slidable middle portion 120, and a shorter end portion 125. The pin 110 may be moved axially within the clevis 105 between the positions of the pin 110 illustrated in FIGS. 6 and 7. As schematically shown in FIG. 6, the intermediate portion 115A is screwed onto the long end portion 115 by means of mating threads 116 on one end of the long portion 115 and the mating end of the intermediate portion 115A. The end portions 125 and 115 and the intermediate portion 115A are preferably maintained in mutual axial alignment while the slidable portion 120 may be disposed concentrically or eccentrically with respect to the end portions 115 and 125.

Two bolt holes extend axially in each portion of the pin 110. Referring to FIGS. 2, 3, 4, 6 and 7, bolt holes 140 and 145 are located in the end portion 115; bolt holes 140B and 145B are located in the intermediate portion 115A; bolt holes 140A and 145A are located in the short end portion 125; and bolt holes 150 and 151 are located in the slidable portion 120. Threads 180 and 181 are formed in the inner ends of the bolt holes 140 and 145, respectively, in the pin end portion 115.

In FIG. 6, the slidable portion 120 is in the concentric position with respect to the end portions 115 and 125. In this position, the bolt hole 150, in the slidable portion 120, is aligned with the bolt holes 140, 140A, and 140B and a bolt 130 is received in these holes and screwed into threads 180.

As illustrated in FIG. 7, when the slidable portion 120 is in an eccentric position, with respect to the end portions 115 and 125, the bolt hole 151 is aligned with the bolt holes 145, 145A, and 145B, and the bolt 130 is received in these holes and screwed into threads 181. A hexagonally shaped portion 165 is formed on the outside end of the short end portion 125, as shown in FIGS. 1–4.

As illustrated in FIG. 2, dovetail tongues 155 are formed in the middle of each end face of the cylindrical slidable portion 120. The dovetail tongues are mutually parallel, each extending diametrically across the end faces and protruding axially. Mating dovetail slots 160 are formed in the end face of the intermediate portion 115A and the short end portion 125 for slidably receiving the dovetail tongues 155, as shown in FIG. 2. The dovetail arrangement permits transverse movement of the slidable portion while preventing axial movement relative to the adjacent pin elements. The orientation of the arrow indicia provided on the end of hexagonal portion 165 corresponds to the orientation of the dovetail tongues 155 and slots 160.

As shown in FIG. 8, the dovetail tongue 155 has its top end 156 formed flush with the outer circumferential surface 121 of the cylindrical slidable portion 120. The bottom end 157 of the tongue 155 terminates radially inwardly from the outer surface 121 of the slidable portion 120. Thus, as shown in FIG. 7, the tongue 155 has a length A which is less than the diameter B of the slidable portion 120.

As shown in FIG. 5, the length G of the slidable portion 120, not including the dovetail tongues 155, is slightly less than the length H between the parallel legs 102. Thus, when the slidable portion 120 is disposed between the legs 102, the dovetail tongues 155 extend into the holes in the legs 102. As shown in FIG. 8, when the slidable portion 120 is in the eccentric position with respect to the remainder of the pin 110, the bottom portion 157 of the dovetail tongue abuts the inner surface 185 of the hole in the leg 102. The eccentric position of the slidable portion 120 is therefore determined by the length A of the dovetail tongue 155. Similarly, when the slidable portion 120 is in the concentric position discussed above, the top portion 156 of the dovetail tongue abuts the inner surface 185 of the hole in the leg 102.

A retaining ring stop 171 located on the pin short end portion 125 limits the axial movement of the pin into the clevis 105.

OPERATION

FIGS. 1 and 6 illustrate the normal position of the pin 110 in which the long end portion 115 supports the snubber 100 within the clevis 105. Two cotter keys 135a and 135b locate the pin 110 in this position.

The movable portion 120 of the pin 110 and the short end portion 125 of the pin 110 are both located exteriorly of the clevis 105, and held axially aligned in the concentric configuration by the bolt 130. In this position the bolt 130 extends through the aligned holes 140a, 150, 140b, and 140. If it is desired that the snubber be tested, the pin 110 is rotated until the dovetail tongue 155 of the movable portion 120 is oriented in a horizontal direction. This position is indicated by the horizontally extending arrow indicia on the element 165 illustrated in FIG. 3. The cotter key 135a is then removed, and the pin 110 moved axially within the clevis 105 until the stop ring 171 abuts the clevis 105, as shown in FIGS. 5 and 7. In this position, the movable portion 120 of the pin 110 is accurately located between the legs 102, except that the tongues 155 extend into the clevis holes.

Figure 4:
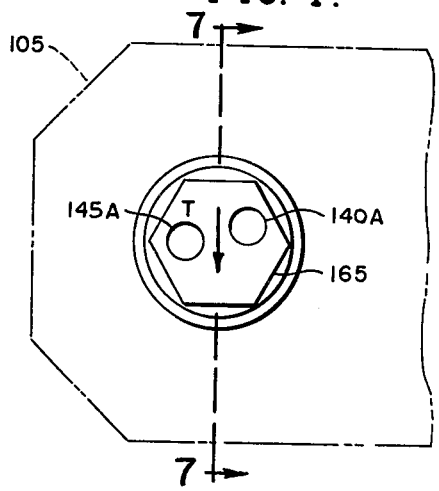
FIG. 4 is a view similar to FIG. 3 with arrow on the pin positioned vertically which indicates the pin is properly oriented for transformation from its concentric configuration to its eccentric configuration under the weight of the snubber.

The bolt 130, disposed within the holes 140, 150, and 140A, is withdrawn from the pin 110. The pin is then rotated until the dovetail tongue 155 extends vertically as shown in FIG. 2, and the arrow on the hex portion 165 points downward, as shown in FIG. 4. In this configuration, the weight of the snubber 100 is usually sufficient to slide the movable portion 120 within the dovetail slots 160 provided in the end portion 115 and the short end portion 125. The movement of the portion 120 is stopped when the end 157 of each of the dovetail tongues 155 strikes the inner surface 185 of the holes in the arms 102 and clevis 105, as illustrated in FIGS. 7 and 8. The distance of travel of the movable portion 120 of the snubber is determined by the difference between the diameter B of the holes provided in the legs 102, and the length A of the dovetail tongue 155.

As noted before, the length A of the dovetail tongue 155 determines the eccentric position of the slidable portion 120 in which the bolt holes 145, 145A, 145B, 151 are mutually aligned, when the bottom end 157 of the dovetail tongue 155 abuts the inner surface 185 of the hole in the arm 102. After the pin 110 is in the eccentric configuration illustrated in FIG. 7, bolt 130 is inserted into the pin 110 through the test holes 145A, 145B, 150, 145. Consequently, rotation of the pin 110 causes an eccentric motion of the movable portion 120. This will cause the tongue 101 to move in orbital fashion and the snubber 100 to reciprocate linearly.

It is contemplated that the rotation of the pin 110 will be accomplished by a wrench holding the hexagonal portion 165. When the hexagonal portion 165 is rotated or rocked arcurately back and forth about the axis of the pin 110, the eccentrically configured slidable portion 120 of the pin 110 will move in an orbital manner around the axis of the end portions 115 and 125. This movement will produce orbital motion in the end of the snubber 100, having a component of translational motion along the axis of the snubber 100. The translational component of the motion will cause the snubber to alternately expand and contract a small amount in a reciprocating motion.

Snubbers of the type of U.S. Pat. No. Re.29,221 have two mutually telescoping portions. The two portions may move or accelerate with respect to one another below a certain threshold acceleration, while acceleration of the two portions relative to one another greater than the threshold acceleration will be braked by the unique action of the snubber. Thus, the mobility of the telescoping portions of the snubber may be tested by rotating the hexagonal portion 165 so as to apply a linear component of acceleration to the snubber which is below the acceleration threshold of the snubber. The snubber should offer very little resistance to such a rotation of the pin 110 in that it should freely accommodate thermal expansion and contraction of the structures to which it is connected.

The snubbing function of the snubber may also be tested by increasing the acceleration with which the hexagonal portion 110 is moved. When the threshold acceleration is reached, the snubber should brake or limit the motion. The movement of the pin may also be accomplished with special test apparatus adapted to ensure that the proper amount of force on acceleration is exerted on the snubber 100 in fulfillment of any engineering test requirements that may exist.

Figure 3:
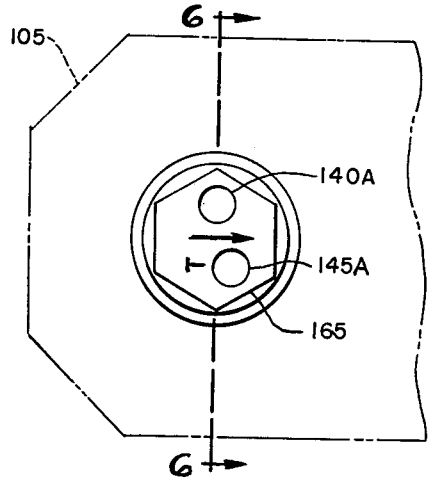
FIG. 3 is an end view of the mounting pin disposed within the clevis showing the arrow on the pin end extending horizontally.

The pin 110 may be returned to its normal operational configuration performing the operations described in the discussion above in reverse manner. Thus, the pin is rotated until the arrow indicia provided on the hex nut 165 points horizontally as shown in FIG. 3. The bolt 130 is withdrawn from the pin, and the pin 110 is then rotated until the arrow indicia points up. In this orientation, the weight of the snubber 100 will force the movable portion 120 to return to its normal concentric configuration with respect to the end portions 115 and 125. The movement of the movable portion 120 is stopped when the top surface 156 of the dovetail tongue 155 strikes the inner surface 185 of the hole in the arm 102. In this position, the holes 140, 140A, 140B, and 151 are mutually aligned and the bolt 130 is then reinserted through them. The pin 110 may be rotated until the arrow points horizontally. The pin 110 is then slid axially within the clevis 105 until the end portion 115 of the pin supports the tongue 101 of the snubber 100 within the clevis 105, as is shown in FIG. 6. The cotter key 135a is then reinserted into the pin 110.

Because the intermediate portion 115A of the pin 110 is threaded onto the long end portion 115, one test portion comprising an end portion 115A, a slidable portion 120, and an end portion 125, may be used to individually test a large number of snubbers in place. Alternatively, portion 115A may be formed integral with portion 115.

What is claimed is:

1. A mounting device supporting a motion snubber useful for inducing motion in said snubber to permit testing of the snubber in place comprising:
   pin means supporting said snubber including a main portion to be disposed within pin supporting structure where said snubber is mounted;
   a movable portion disposed axially adjacent said main portion and within a mounting element on said snubber, movable between a concentric position and an eccentric position with respect to said main portion while supporting said snubber;
   means formed in said pin means for guiding the movement of said movable portion between said concentric position and said eccentric position; and
   means for affixing the position of said movable portion in said eccentric position or in said concentric position.

2. A mounting device as defined in claim 1 further comprising:
   means facilitating rotation of said pin means, for inducing motion in said movable portion whenever said movable portion is eccentrically configured, thereby inducing motion in said snubber.

3. A mounting device as defined in claim 1 wherein said guiding means prevents axial movement of said main portion with respect to said slidable portion.

4. The mounting device of claim 1 wherein said guiding means comprises mating tongue and slot means formed on the mating end faces of said main portion and said movable portion.

5. A mounting device as defined in claim 4 wherein said mating tongue has a length which is less than the diameter of said pin means and said slot is longer than said tongue.

6. A mounting device as defined in claim 1 wherein said guiding means comprises:
   a dovetail slot formed in and extending across the end face of said main portion facing said movable portion; and
   a dovetail tongue formed on and extending across the end face of said movable portion and being slidably received within said dovetail slot.

7. A mounting device as defined in claim 4 wherein said movable portion has only its tongue extending into said dovetail slot in said main portion within said pin supporting structure, one end of said dovetail tongue abutting said pin supporting structure whenever said movable portion is in said concentric configuration and another end of said dovetail tongue abutting said pin supporting structure whenever said movable portion is in said eccentric position.

8. A mounting device as defined in claim 1 wherein said means for affixing the configuration of said pin comprises:
   a bolt; and
   means for selectively securing said bolt within said movable portion and said main portion in either of said eccentric and concentric positions.

9. A mounting device as defined in claim 8 wherein said means for securing said bolt comprises:
   a first threaded bolt hole in said main portion which is aligned with a first bolt receptacle in said movable portion whenever said movable portion is disposed in a concentric configuration with respect to said main portion; and
   a second threaded bolt hole provided in said main portion which is aligned with a second bolt receptacle provided in said movable portion whenever said movable portion is disposed in an eccentric configuration with respect to said main portion.

10. A mounting device as defined in claim 1 wherein said pin means are slidable in an axial direction within said pin supporting structure; and
said main portion comprises an end portion for normal mounting of said snubber and an intermediate portion adjacent said movable portion.

11. A mounting device as defined in claim 10 further comprising:
means for axially locating said end portion within said pin supporting structure and within said snubber.

12. A mounting device as defined in claim 10 further comprising stop means for precisely locating said movable portion within said snubber and said intermediate portion within said pin supporting structure.

13. A mounting device as defined in claim 1 wherein said guiding means further comprises a radially facing stopping surface on said movable portion for stopping its movement at one of said concentric and eccentric positions.

14. A mounting device as defined in claim 1 wherein said guiding means further comprises a radially facing stopping member on said movable portion abutting against said pin supporting structure whenever said movable portion is in said eccentric position, and wherein the eccentricity of said eccentric position is defined by the difference between the radius of said main portion, and the radial location of said stopping surface.

15. An eccentric mounting pin comprising:
a main portion for mounting in a pin support structure;
a movable portion disposed at one end of said portion axially parallel with said main portion;
guide means formed in said main portion and said movable portion for guiding movement of said movable portion between a position concentric with respect to said main portion and a position eccentric with respect to said main portion;
means for affixing said movable portion in either of said positions and,
said guide means including a radially facing stopping surface on said movable portion for engaging said pin support structure in said eccentric position.

16. An eccentric mounting pin as defined in claim 15 wherein said stopping surface limits the length of said movement.

17. An eccentric mounting pin as defined in claim 15 wherein the difference between the radius of said main portion and the radial location of said stopping surface determines the eccentricity of said eccentric position of said pin.

18. An eccentric mounting pin comprising:
a main portion for mounting in a pin support structure;
a movable portion;
a tongue formed in and protruding axially from an end face of said movable portion, said end face facing an end face of said main portion, said tongue extending transversely of said pin on said end face of said movable portion;
a slot formed on said end face of said main portion, said slot extending transversely on said end face of said main portion; and
said tongue extending away from said movable portion into said slot in said main portion for a sufficient distance so that a radial end of said tongue impacts said pin support structure upon movement of said movable portion and thereby constrains the eccentricity of said pin.

19. A mounting pin as defined in claim 18 further comprising:
a bolt hole in said movable portion aligned with a bolt hole in said main portion whenever said movable portion is in a concentric position with respect to said main portion;
a bolt hole in said movable portion aligned with a bolt hole in said main portion whenever said movable portion is in an eccentric position with respect to said main portion; and
a bolt insertable in said bolt holes for affixing the position of said movable portion in either said concentric position or said eccentric position.

20. An eccentric mounting pin comprising:
a main portion;
a movable portion;
a tongue formed in and protruding axially from an end face of said movable portion, said end face facing an end face of said main portion, said tongue extending transversely of said pin on said end face of said movable portion;
a slot formed on said end face of said main portion, said slot extending transversely on said end face of said main portion;
an end section forming a conventional mounting pin; and
an intermediate section threadably connected on one end to said end section, the other end of said intermediate section facing said movable portion.

21. Apparatus comprising:
a clevis comprising a pair of parallel legs, each having a hole formed therein;
a motion snubber having a pair of strut members movable on each other, means for braking the relative movement of said members; and a mounting tongue formed on one of said strut members having a mounting hole formed therein;
a mounting pin including a pair of spaced cylindrical support portions, each disposed within one of said clevis leg holes;
a cylindrical slidable portion disposed between and axially parallel to said pair of support portions;
an elongate dovetail tongue integrally formed with and protruding axially from each end face of said cylindrical slidable portion and extending radially transversely of said slidable portion, a first end of each of said dovetail tongues formed flush with the cylindrical side surface of said slidable portion, a second end of eac of said dovetail tongues terminated short of said cylindrical side surface of said slidable portion;
a dovetail slot extending transversely on an end face of each of said support portions and each slidably receiving one of said dovetail tongues; and
said slidable portion being positioned within said snubber mounting tongue hole and disposed completely between said clevis legs except that said dovetail tongues extend into the adjacent clevis leg holes;
said slidable portion having a concentric position with respect to said support portions wherein said first ends of said dovetail tongues abut the inner surfaces of said clevis leg holes, and having an eccentric position wherein said second ends of said dovetail tongues abut said inner surfaces;

a first plurality of bolt holes formed in said support portions and said slidable portion mutually axially aligned when said slidable portion is in said concentric position;

a second plurality of bolt holes formed in each of said support portions and said slidable portion mutually axially aligned when said slidable portion is in said eccentric position;

a bolt selectively inserted in either of said plurality of bolt holes to fix said slidable portion in either said eccentric or concentric positions; and means for rotating said pin, inducing orbital motion in said slidable portion when in said eccentric position and thereby inducing motion in said one strut member of said snubber.

22. A method of testing in place the reciprocating movement of a motion snubbing device extending between a support and the item whose motion is to be snubbed, comprising:

mounting the device on a pin portion which is movable between eccentric and concentric positions;

moving the pin portion to its eccentric position;

locking the pin portion in said eccentric position;

rotating or rocking the pin to cause the pin portion to move in an orbital path, thereby inducing motion in said device;

returning the movable portion to its concentric portion; and locking said portion in its concentric position.

23. The method of claim 22 including sliding said pin axially so that the device is supported by the movable portion when it is to be tested or supported by a non-movable portion when the device is not to be tested.

24. In a mounting apparatus comprising a motion snubber, a pin supporting member, a pin having a first portion disposed within and supporting said structural member and a second portion disposed within and supported by said supporting member, the method for imparting linear motion to said snubber comprising:

moving said first portion from a concentric position with respect to said second portion to an eccentric position with respect to said second portion;

affixing said eccentric position of said first portion with respect to said second portion;

rotating said pin about its axis thereby imparting reciprocating linear motion to said snubber; and returning said first portion to said concentric position and affixing said concentric position of said first portion.

25. In a mounting apparatus comprising a motion snubber, a supporting member, and a pin, a main portion of which pin is disposed within a hole in a leg of said supporting member, said hole having an interior surface, and a movable portion of which pin is disposed within a tongue of said snubber, a first guide means formed in and protruding axially from said movable portion received by a second guide means formed in said support portion, said first guide means protruding axially into said hole, the method for imparting linear reciprocating motion to said mounted member comprising:

moving said movable portion from a concentric position with respect to said main portion to an eccentric position with respect to said main portion;

stopping the motion of said movable portion by abutting the inner surface of said hole in said leg of said supporting member by said first guide means when said movable portion reaches said eccentric position;

inserting bolt means into bolt holes provided in said pin for securing said movable portion in said eccentric configuration with respect to said main portion; and rotating said pin, thereby inducing orbital motion in said movable portion and reciprocating linear motion in said snubber.

26. In a mounting apparatus comprising a telescoping snubber connected to a supporting member by a pin, a main portion of which pin is disposed within a hole formed in a leg of said member, said hole having an inner surface, and a movable portion of which pin is disposed within a tongue of said snubber, a dovetail tongue guide means formed on each end of said movable portion extending transversely of said movable portion into said hole, and received in a dovetail slot guide means formed in said main portion, and bolt means for securing said movable portion alternatively in a eccentric position or an concentric position with respect to said main portion, the method for testing said telescoping snubber by inducing reciprocating linear motion in said snubber without disassembly of said mounting apparatus comprising:

rotating said pin about its axis until said direction of said transversely extending dovetail tongue guide means is horizontal;

withdrawing said bolt means;

rotating said pin until said snubber and said slidable portion move under the weight exerted by said snubber from said concentric position to said eccentric position;

abutting said inner surface of said hole in said leg by one end of said dovetail tongue guide means when said movable portion reaches said eccentric position, thereby stopping the movement of said movable portion;

inserting said bolt means into said main portion and said movable portion, thereby affixing said eccentric position of said movable portion;

rotating said pin about its axis, thereby inducing orbital motion in said slidable portion and reciprocating linear motion in said telescoping snubber;

rotating said pin about its axis until said direction of said radially transversely extending dovetail tongue guide means is horizontal;

withdrawing said bolt means;

rotating said pin about its axis until said snubber and said movable portion move under the weight of said snubber from said eccentric position to said concentric position;

abutting said inner surface of said hole by another end of said dovetail tongue guide means when said movable portion reaches said concentric position, stopping the movement of said movable portion; and inserting said bolt means into said main portion and said movable portion of said pin, thereby affixing said concentric position of said movable portion.

* * * * *